United States Patent Office 2,871,214
Patented Jan. 27, 1959

2,871,214

ACETONE-WATER SOLUTION OF VINYLIDENE CYANIDE-VINYL ACETATE COPOLYMER AND METHOD FOR PREPARING SAME

Gerald V. Wootton, Lorain, and Howard M. Hoxie, Avon Lake, Ohio, assignors to The B. F. Goodrich Company, New York, N. Y., a corporation of New York No Drawing. Application March 19, 1957
Serial No. 646,966

7 Claims. (Cl. 260—29.6)

This invention relates to novel polymer solutions, and pertains more particularly to spinning dope solutions of certain vinylidene cyanide interpolymers in a unique mixture of acetone, water, and a salt.

U. S. Patents 2,476,270, 2,502,412 and 2,514,387 disclose novel methods for the preparation of monomeric vinylidene cyanide, which is a clear liquid at room temperature and a crystalline solid at 0° C., possessing a melting point when in purest form of about 9.7° C., and which undergoes on contact with water an instantaneous homopolymerization reaction to give a solid water-insoluble resin. On copolymerization of this monomer in mass or in anhydrous organic medium with various other polymerizable materials there are obtained interpolymers which are extremely useful in the preparation of filaments, films and shaped articles possessing many valuable properties including high tensile strengths, low elongation and excellent resistance to the action of chemicals and the weather.

As disclosed in U. S. Patent 2,615,866, interpolymers of vinylidene cyanide with vinyl acetate are particularly unique and useful in that they possess the unusual 1:1 alternating structure, that is, they possess essentially the structure

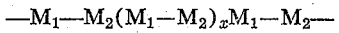

wherein each $M_1$ is a vinylidene cyanide unit of the structure

each $M_2$ is a vinyl acetate unit of the structure

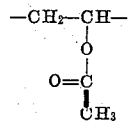

and $x$ is a number, preferably in excess of 100. Analysis of such interpolymers shows that they contain 50 mol percent ±5 mol percent of vinylidene cyanide units regardless of the degree of monomer to polymer conversion, and hence they are essentially 50 mol percent alternating interpolymers.

It has been found, however, that many economical solvents ordinarily employed to dissolve more conventional polymeric materials do not possess sufficient solvent power to dissolve such alternating vinylidene cyanide:vinyl acetate interpolymers. Moreover the few known solvents for such interpolymers are either quite expensive, or not available in commercial quantities, or undesirable, or dangerous to use in commercial practice.

Accordingly it is an object of this invention to provide economical and commercially available materials which possess a high degree of solvent power for essentially 50 mol percent alternating vinylidene cyanide:vinyl acetate interpolymers. Another object is to provide colorless, stable solutions of these vinylidene cyanide:vinyl acetate interpolymers which solutions possess a viscosity such that they are highly suitable for use in the preparation of shaped articles, the casting of films, and the spinning of fibers. A further object is to provide a spinning dope solution for vinylidene cyanide:vinyl acetate interpolymers which can be spun into fibers at atmospheric pressure and temperatures below the boiling point of the solvent, preferably at room temperature or temperatures only slightly above room temperature. Still another object is to provide such a spinning dope solution from which fibers can be spun that are lustrous and transparent, not opaque. Other objects of the invention will be apparent from the description which follows.

Acetone is a widely known, low-cost, commercially available, easily recoverable organic solvent which can be safely handled on production scale runs when reasonable safety precautions such as avoidance of use near open flame and prolonged inhalation of vapors are observed. However, acetone is not a solvent for vinylidene cyanide:vinyl acetate interpolymers under normal conditions of temperature and pressure. Acetone dissolves these materials only at temperatures of 85° C. and higher and since acetone boils at 56.5° C. at atmospheric pressure, such a solvent system is very undesirable. Water, an even cheaper and more readily available material than acetone is also a non-solvent for vinylidene cyanide:vinyl acetate interpolymers. A combination of acetone and water, both of which are non-solvents at atmospheric pressures for vinylidene cyanide:vinyl acetate interpolymers would not be expected to dissolve these materials at atmospheric pressure below 65° C., and does not. However, we have found surprisingly that the addition of as little as 0.2 percent, based on weight of solvent, of an inorganic salt added to acetone-water mixtures containing 1 percent to 25 percent (preferably 5 to 15 percent) water will readily dissolve vinylidene cyanide:vinyl acetate interpolymer to give polymer solutions of as high as 30 to 40 percent by weight of polymer at temperatures below 65° C. and atmospheric pressures. 15 to 25 percent polymer solutions are ordinarily preferred for ease of handling in the spinning apparatus and to give fibers of the best physical properties.

The solutions of vinylidene cyanide:vinyl acetate interpolymers in acetone-water-salt mixtures of this invention are prepared by the methods ordinarily employed in dissolving high polymers. For example, solution may be accomplished simply by placing the polymer, which is generally in the form of a white powder of small particle size, in the solvent and agitating the mixture until solution is complete. It is also often desirable that the polymer solvent mixture be heated slightly, for example at about 40° C. to 80° C., since solution of the polymer is thereby facilitated. In preparing large quantities of polymer solutions, a desirable expedient consists in first cooling the solvent mixture to a temperature at which its solvent power is considerably lowered, adding the polymer while vigorously agitating the liquid so that the polymer particles are dispersed in the cooled solvent and then heating the dispersion whereupon the dispersed particles dissolve. By utilizing this method, lumping or agglomeration is prevented and solution of the polymer is obtained much more readily. The salt may be added to the acetone-water mixture either before or after the polymer, but it is preferred to form a polymer slurry in the acetone-water, generally at room temperature or below, before adding the desired amount of salt. The salt may be added in the dry form, or it may be added dissolved in water, generally in the form of a 5 to 10 percent solution by weight.

Many inorganic salts may be used in the practice of this invention. Most preferred are those which develop strongly hydrated ions when dissolved in water. More particularly preferred are chlorides, bromides, iodides, nitrates, perchlorates, thiocyanates and more especially these salts of the alkali and alkaline earth metals including sodium, lithium, potassium, calcium, zinc, cadmium, and aluminum. Illustrative compounds of the type which can be used include: sodium chloride, lithium chloride, zinc chloride, sodium bromide, lithium bromide, potassium bromide, sodium iodide, ammonium iodide, potassium iodide, half and half mixtures of aluminum chloride-zinc chloride, calcium chloride-zinc chloride, magnesium chloride-zinc chloride, sodium nitrate, potassium nitrate, calcium nitrate, silver nitrate, aluminum nitrate, ammonium nitrate, sodium nitrite, sodium hypochlorate, potassium hypochlorate, ammonium thiocyanate, sodium bisulfate, potassium bisulfate, potassium cyanide, and potassium persulfate.

For best overall results and most satisfactory fiber properties, lithium chloride, zinc chloride, sodium nitrate and ammonium nitrate have been found to be outstanding. On the basis of cost and excellence of fiber properties, sodium nitrate is the preferred salt to use in the practice of this invention.

Solutions having any desired polymer concentration may be prepared since the solvent and polymer utilized in this invention are compatible with one another regardless of precise proportions of each. However, the solvent is generally maintained in considerable excess, to secure a spinnable solution, and solutions containing from about 5 to 30 or 40 percent of polymer are preferred for spinning into fibers or casting into films.

The following examples are intended to illustrate more fully the use of acetone-water-salt mixtures as solvents for vinylidene cyanide:vinyl acetate interpolymers, but are not intended to limit the scope of the invention, for it is, of course, possible to effect many modifications therein. In the examples all parts are by weight.

EXAMPLE I

Following the teachings of U. S. Patent Number 2,615,866, a supply of vinylidene cyanide:vinyl acetate copolymer containing approximately 50 mol percent of each monomer was prepared in the form of a finely divided white powder. When placed in a mixture of acetone and water in capped tubes and held in a water bath for temperature control, the copolymer formed a slurry at room temperature; it did not dissolve. Upon the addition of 0.2 percent to 1.0 percent of sodium chloride based on the weight of total solvent, the process of solution began immediately. Raising the temperature, as would be expected, speeded the formation of the solutions. Amounts of various materials used, conditions and remarks are set forth in Table 1 below. Except for tube Number 1, the copolymer was always added before the salt.

*Table 1*

| Tube No. | Grams Acetone | Grams Water | Grams NaCl | Grams Copolymer | Solution Color | Remarks |
|---|---|---|---|---|---|---|
| 1 | 8.9 | 1.0 | 0.1 | 2.5 | light amber | clear at 65° C. |
| 2 | 7.9 | 2.0 | 0.1 | 2.5 | ____do____ | clear at 63° C. |
| 3 | 8.9 | 1.0 | 0.02 | 2.5 | ____do____ | |
| 4 | 6.9 | 3.0 | 0.02 | 2.5 | colorless | |
| 5 | 8.9 | 1.0 | 0.0 | 2.5 | | slurry, polymer not dissolved at 65° C. |
| 6 | 9.9 | 0.0 | 0.1 | 2.5 | | Do. |
| 7 | 0.0 | 9.9 | 0.1 | 2.5 | | Do. |

EXAMPLE II

Two solutions of salt in water were prepared at salt strengths of five percent and ten percent by weight of salt. As in Example I, mixtures of acetone and water were prepared in tubes at room temperature and vinylidene cyanide:vinyl acetate copolymer was slurried therein. Amounts of ingredients, conditions, and remarks are set forth in Table 2 below.

*Table 2*

| Tube No. | Grams Acetone | Grams Salt | Grams Water | Salt Solution, Percent | Temperature, ° C. | Remarks |
|---|---|---|---|---|---|---|
| 1 | 8.9 | 0.1 | 0.9 | 10 | 25 | clear solution at 35° C. |
| 2 | 9.4 | 0.02 | 0.5 | 5 | 25 | clear solution at 60° C. |
| 3 | 8.9 | 0.0 | 0.9 | | 25 | did not dissolve at 65° C. |

Addition of very small amounts of salt, 0.2 percent to 1 percent by weight of total solvent, added dry or in the form of a solution, has converted the pair acetone-water which will not dissolve vinylidene cyanide:vinyl acetate copolymer below 65° C. to an efficient low temperature solvent. Acetone-water, and most water-salt mixtures do not dissolve the copolymer below 65° C. All three ingredients must be present to form a solvent at temperatures ranging from 25° C. to 65° C.

Some acetone-salt mixtures such as acetone-potassium thiocyanate will dissolve vinylidene cyanide:vinyl acetate copolymers at room temperature, but these solutions are then found to be rheopectic, that is, they solidify under the influence of a regular gentle motion, and cannot be passed through a spinnerette and formed into fibers.

EXAMPLE III

In this example 2.5 grams of 1 to 1 molar vinylidene cyanide:vinyl acetate copolymer were slurried in a mixture of 8.9 grams of acetone and 1.0 gram of water in a glass tube. The test salt, dissolved in water, was then added to the copolymer slurry and the tube was capped and held in a slowly heated bath. Amounts of ingredients, kinds of salts, temperatures and remarks are listed in Table 3 below:

Table 3

| Tube No. | Kind of Salt | Grams of Salt | Dissolving Temperature Start, °C. | Dissolving Temperature Clear, °C. | Remarks |
|---|---|---|---|---|---|
| 1 | LiBr | 0.1 | 25 | 25 | light amber. |
| 2 | NaBr | 0.1 | 25 | 25 | pale amber. |
| 3 | NaBr | 0.7 | 25 | 25 | lighter and less viscous than No. 2. |
| 4 | $NH_4Br$ | 0.1 | 25 | 25 | light amber, less viscous than No. 5. |
| 5 | KBr | 0.1 | 25 | 25 | light amber. |
| 6 | KI | 0.1 | 25 | 25 | |
| 7 | KI | 0.7 | 25 | 25 | lighter and less viscous than No. 6. |
| 8 | $NH_4I$ | 0.1 | 25 | 25 | lighter than No. 9. |
| 9 | $NH_4I$ | 0.7 | 25 | 25 | less viscous than No. 8. |
| 10 | NaI | 0.1 | 25 | 25 | light amber. |
| 11 | $AlCl_3$ / $ZnCl_2$ | 0.1 / 0.1 | 25 | 25 | very pale amber. |
| 12 | $MnCl_2$ / $ZnCl_2$ | 0.1 / 0.1 | 25 | 25 | light amber. |
| 13 | $KClO_3$ | 0.1 | 25 | 49 | light color, but fairly viscous. |
| 14 | $KClO_3$ | 0.7 | 25 | 55 | |
| 15 | $NaClO_3$ | 0.1 | 25 | 25 | light amber. |
| 16 | $NaClO_3$ | 0.7 | 25 | 25 | less viscous than No. 15. |
| 17 | $NaNO_2$ | 0.1 | 26 | 26 | less viscous than No. 18. |
| 18 | $NaNO_2$ | 0.7 | 26 | 26 | lighter than No. 17. |
| 19 | $NaNO_3$ | 0.1 | 26 | 26 | less viscous than No. 20. |
| 20 | $NaNO_3$ | 0.7 | 26 | 26 | lighter than No. 19. |
| 21 | $NH_4NO_3$ | 0.1 | 25 | 25 | light amber. |
| 22 | $NH_4NO_3$ | 0.7 | 25 | 25 | lighter than No. 21. |
| 23 | KCN | 0.1 | 25 | 25 | |
| 24 | $NH_4SCN$ | 0.1 | 25 | 25 | lighter than No. 25. |
| 25 | $NH_4SCN$ | 0.7 | 25 | 25 | less viscous than No. 24. |
| 26 | $NaHSO_3$ | 0.1 | 25 | 40 | lighter than No. 27. |
| 27 | $NaHSO_3$ | 0.7 | 25 | 40 | |
| 28 | $NH_2CONH_2$ | 0.5 | 25 | 58 | |
| 29 | $NH_2CONH_2$ | 0.7 | 25 | 53 | |
| 30 | $Na_4P_2O_7$ | 0.1 | 25 | 55 | |

In general, higher amounts of salt lead to lower solution temperatures and lighter colored solutions.

EXAMPLE IV

Using ammonium nitrate as the salt at the rate of 0.5 percent, slurries of 1 to 1 molar vinylidene cyanide:vinyl acetate in acetone-water were made as in earlier examples, except that the percent water was varied to determine if this would have any effect on the final solution. Data are summarized in Table 4, below:

Table 4

| Tube No. | Grams Acetone | Grams Water | Percent Water | Remarks |
|---|---|---|---|---|
| 1 | 8.9 | 1.0 | 10.1 | Polymer dissolved at 25° C. |
| 2 | 8.5 | 1.5 | 15.0 | Polymer dissolved at 42° C. to 45 C. |
| 3 | 7.9 | 2.0 | 20.2 | Polymer dissolved above 60° C. |
| 4 | 7.4 | 2.5 | 25.3 | Polymer dissolved above 64° C. |
| 5 | 6.9 | 3.0 | 30.3 | Polymer dissolved above 64° C. |

Increasing water content raises the temperature required to obtain solution of polymer.

EXAMPLE V

An acetone-water mixture in the ratio of 71.2 grams of actone to 10 grams of water was prepared. This had a volume of 100 cc. Enough 1 to 1 molar vinylidene cyanide:vinyl acetate copolymer was slurried into the solvent to make 16 percent copolymer by weight. 0.74 percent of ammonium nitrate, based on the total weight of solvent present, was then added, and the copolymer slurry turned into a copolymer solution after a few minutes agitation at room temperature. This spinning dope was extruded at 1.5 cc. per minute through a 100 hole, 0.004 inch per hole spinneret into a coagulating bath containing 40 percent acetone, 60 percent water and held at 50° C. The yarn was passed through a second coagulating bath at 50° C. and wound up at 7–8 feet per minute on a Godet. Next it passed through a water cascade at 45° C. and thence to a drying drum carrying steam at 14 p. s. i. g.=120° C. Finally the yarn was drawn at 190° C. on a 6 inch long slotted block. Instron physical data are summarized in Table 5, below:

Table 5

| Draw Ratio [1] | Tensile, g. per denier | Breaking Elongation, percent |
|---|---|---|
| As spun | 0.43 | 4.6 |
| 1.2 | 0.81 | 10.2 |
| 1.5 | 1.01 | 21.2 |
| 2.0 | 1.32 | 14.2 |
| 2.5 | 1.49 | 18.6 |
| 3.0 | 1.45 | 16.4 |
| 3.5 | 1.89 | 18.2 |

[1] From relative speeds of input and output Godets.

This strength data shows that satisfactory fibers have been spun from the acetone-water-salt solution.

Although specific examples of the invention have been herein described, it is not intended to limit the invention solely thereto, but to include all of the variations and modifications falling within the spirit and scope of the appended claims. For instance many combinations of the salts listed and described herein would work satisfactorily in the formation of these room temperature solvents for vinylidene cyanide:vinyl acetate interpolymers.

We claim:

1. A composition of matter comprising from 5 percent to 50 percent by weight of a copolymer of vinylidene cyanide:vinyl acetate, said copolymer containing about 45 to 55 mol percent vinylidene cyanide in polymerized form, dissolved in a solvent mixture consisting of 75 to 95 parts of acetone, 5 to 25 parts of water, the sum of said parts of acetone and water being 100, and from 0.1 to 2.0 parts of an inorganic highly water-soluble hydrated metal salt, selected from the group consisting of chlorides, bromides, iodides, thiocyanates, perchlorates, and nitrates.

2. The method of forming a spinning dope solution of a vinylidene cyanide:vinyl acetate interpolymer containing about 45 to 55 mol percent vinylidene cyanide in polymerized form, which comprises adding said interpolymer to a mixture consisting of 75 to 95 parts of acetone and 5 to 25 parts of water, so that the sum of the parts of acetone and water is 100, in such proportions as to provide a 5 to 40 percent by weight slurry of said interpolymer in said mixture, and then adding 0.1 to 2.0 parts of an inorganic highly water-soluble hydrated metal salt selected from the group consisting of chlorides, bromides, iodides, thiocyanates, perchlorates, and nitrates, meanwhile maintaining the temperature of the mixture at 20° C. to 65° C. whereby to form a smooth, homogeneous spinning dope solution.

3. The composition of claim 1 in which the inorganic salt is sodium nitrate.

4. The composition of claim 1 in which the inorganic salt is ammonium nitrate.

5. The compostion of claim 1 in which the inorganic salt is lithium chloride.

6. The composition of claim 1 in which the inorganic salt is zinc chlorde.

7. The composition of claim 1 in which the inorganic salt is sodium chloride.

References Cited in the file of this patent

UNITED STATES PATENTS

| 2,589,294 | Schmidt | Mar. 18, 1952 |
| 2,605,246 | Cresswell | July 29, 1952 |
| 2,615,866 | Gilbert et al. | Oct. 28, 1952 |
| 2,615,868 | Miller | Oct. 28, 1952 |
| 2,628,954 | Gilbert | Feb. 17, 1953 |
| 2,819,253 | Gasteff | Jan. 7, 1958 |